United States Patent
Kim et al.

(10) Patent No.: US 11,341,043 B2
(45) Date of Patent: May 24, 2022

(54) STORAGE DEVICE CONFIGURED TO PERFORM AN ALIGNMENT OPERATION AND STORAGE SYSTEM INCLUDING THE SAME

(71) Applicant: SAMSUNG ELECTRONICS CO., LTD., Suwon-si (KR)

(72) Inventors: Byoung-Geun Kim, Seoul (KR); In-Hwan Doh, Seoul (KR); Joo-Young Hwang, Suwon-si (KR); Seung-Uk Shin, Seoul (KR); Min-Seok Ko, Seoul (KR); Jae-Yoon Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 249 days.

(21) Appl. No.: 16/543,093

(22) Filed: Aug. 16, 2019

(65) Prior Publication Data

US 2020/0159656 A1 May 21, 2020

(30) Foreign Application Priority Data

Nov. 16, 2018 (KR) .................. 10-2018-0141947

(51) Int. Cl.
*G06F 12/02* (2006.01)
*G06F 9/38* (2018.01)
*G06F 12/10* (2016.01)

(52) U.S. Cl.
CPC ........ *G06F 12/0253* (2013.01); *G06F 9/3816* (2013.01); *G06F 12/10* (2013.01); *G06F 2212/1044* (2013.01); *G06F 2212/657* (2013.01)

(58) Field of Classification Search
CPC ............................... G06F 9/3816; G06F 12/10
USPC ................... 711/103, E12.008, E12.017, 154
See application file for complete search history.

(56) References Cited

U.S. PATENT DOCUMENTS

| | | | | |
|---|---|---|---|---|
| 4,860,197 A | * | 8/1989 | Langendorf | G06F 9/30152 712/238 |
| 5,584,009 A | * | 12/1996 | Garibay, Jr | G06F 9/30181 711/117 |
| 5,889,997 A | * | 3/1999 | Strunk | G06F 8/445 717/151 |
| 8,489,850 B2 | | 7/2013 | Kaneko et al. | |
| 8,996,791 B2 | | 3/2015 | Okubo et al. | |
| 9,146,858 B2 | | 9/2015 | Aso | |
| 9,466,383 B2 | | 10/2016 | Peng et al. | |
| 10,482,012 B1 | * | 11/2019 | Gordon | G06F 12/0284 |
| 2008/0189501 A1 | * | 8/2008 | Irish | G06F 13/1631 711/167 |
| 2010/0185802 A1 | * | 7/2010 | Asnaashari | G06F 3/0688 711/103 |

(Continued)

*Primary Examiner* — Michelle T Bechtold
*Assistant Examiner* — Edward Waddy, Jr.
(74) *Attorney, Agent, or Firm* — F. Chau & Associates, LLC

(57) ABSTRACT

A storage device includes a non-volatile memory including a plurality of memory blocks. The storage device performs an alignment operation in response to receipt of an align command. The alignment operation converts a received logical address of a logical segment into a physical address and allocates the physical address to a physical block address corresponding to a free block. The storage device is further configured to performs a garbage collection in units of the physical block address that indicates one memory block.

19 Claims, 14 Drawing Sheets

(56) References Cited

U.S. PATENT DOCUMENTS

| | | | |
|---|---|---|---|
| 2013/0027802 A1* | 1/2013 | Kim | G06F 3/064 |
| | | | 360/49 |
| 2014/0136575 A1 | 5/2014 | Zhao et al. | |
| 2015/0121021 A1* | 4/2015 | Nakamura | G06F 3/0659 |
| | | | 711/159 |
| 2015/0193155 A1* | 7/2015 | Sarcone | G06F 12/0862 |
| | | | 714/764 |
| 2015/0347291 A1 | 12/2015 | Choi et al. | |
| 2016/0357776 A1 | 12/2016 | Sundaram et al. | |
| 2017/0308464 A1 | 10/2017 | Hwang | |
| 2018/0032647 A1* | 2/2018 | Wright | G06F 30/13 |

\* cited by examiner

STORAGE DEVICE CONFIGURED TO PERFORM AN ALIGNMENT OPERATION AND STORAGE SYSTEM INCLUDING THE SAME

CROSS-REFERENCE TO RELATED APPLICATION

This U.S. non-provisional application claims the benefit of and priority under 35 U.S.C. 119 to Korean Patent Application No. 10-2018-0141947, filed on Nov. 16, 2018, in the Korean Intellectual Property Office, the disclosure of which is incorporated by reference in its entirety herein.

BACKGROUND

1. Technical Field

The inventive concept relates to a storage device and a storage system including the storage device, and more particularly, to a storage system including a host and a storage device.

2. Discussion of Related Art

A storage system includes a host device and a storage device, and is connected via various interface standards such as universal flash storage (UFS), serial advanced technology attachment (SATA), small computer small interface (SCSI), serial attached SCSI (SAS), and embedded multimedia card (eMMC). The storage device may include a non-volatile memory and a memory controller. Non-volatile memories may include flash memories, magnetic random access memory (MRAM), phase-change RAM (PRAM), and ferroelectric RAM (FeRAM).

A non-volatile memory may retain stored data even when supply of electric power thereto is blocked. Recently, storage devices including flash-based non-volatile memories such as eMMC, UFS, solid state drive (SSD), and memory cards have been widely used to store or transfer a large amount of data.

In a non-volatile memory, garbage collection may be performed to free up whole memory blocks for subsequent writing. However, degradation in performance of the storage device and reduction in the lifespan of the storage device may be caused when the garbage collection is repeatedly performed.

SUMMARY

At least embodiment of the inventive concept provides a storage device capable of aligning a unit for executing garbage collection in a host device and a unit for controlling garbage collection in a storage device with each other, and a storage system including the storage device.

According to an exemplary of the inventive concept, there is provided a storage device including a non-volatile memory including a plurality of memory blocks. The storage device is configured to perform an alignment operation in response to receipt of an align command. The alignment operation converts a received logical address of a logical segment into a physical address and allocates the physical address to a physical block address corresponding to a free block. The storage device is further configured to perform garbage collection in units of the physical block address that indicates one memory block.

According to an exemplary embodiment of the inventive concept, there is provided a storage device including a non-volatile memory comprising a plurality of memory blocks. The storage device creates a dummy storage region of a first size in a physical block address when unable to store data of the first size in a physical block address. The storage device outputs a misalignment signal indicating a misalignment of the physical block address and a logical segment based on the created dummy storage region. The storage device is configured to perform garbage collection in units of the physical block address that indicates one memory block.

According to an exemplary embodiment of the inventive concept, there is provided a storage system including a storage device and a host device. The storage device has a non-volatile memory including a plurality of memory blocks. The storage device is configured to perform garbage collection in units of a physical block address that indicates one memory block. The host device is configured to control the garbage collection in the storage device in units of a logical segment. The storage device transmits a misalignment signal to the host device when a starting point of the logical segment is misaligned with a starting point of the physical block address.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Hereinafter, one or more exemplary embodiments of the inventive concept will be described in detail with reference to accompanying drawings.

Figure 1:
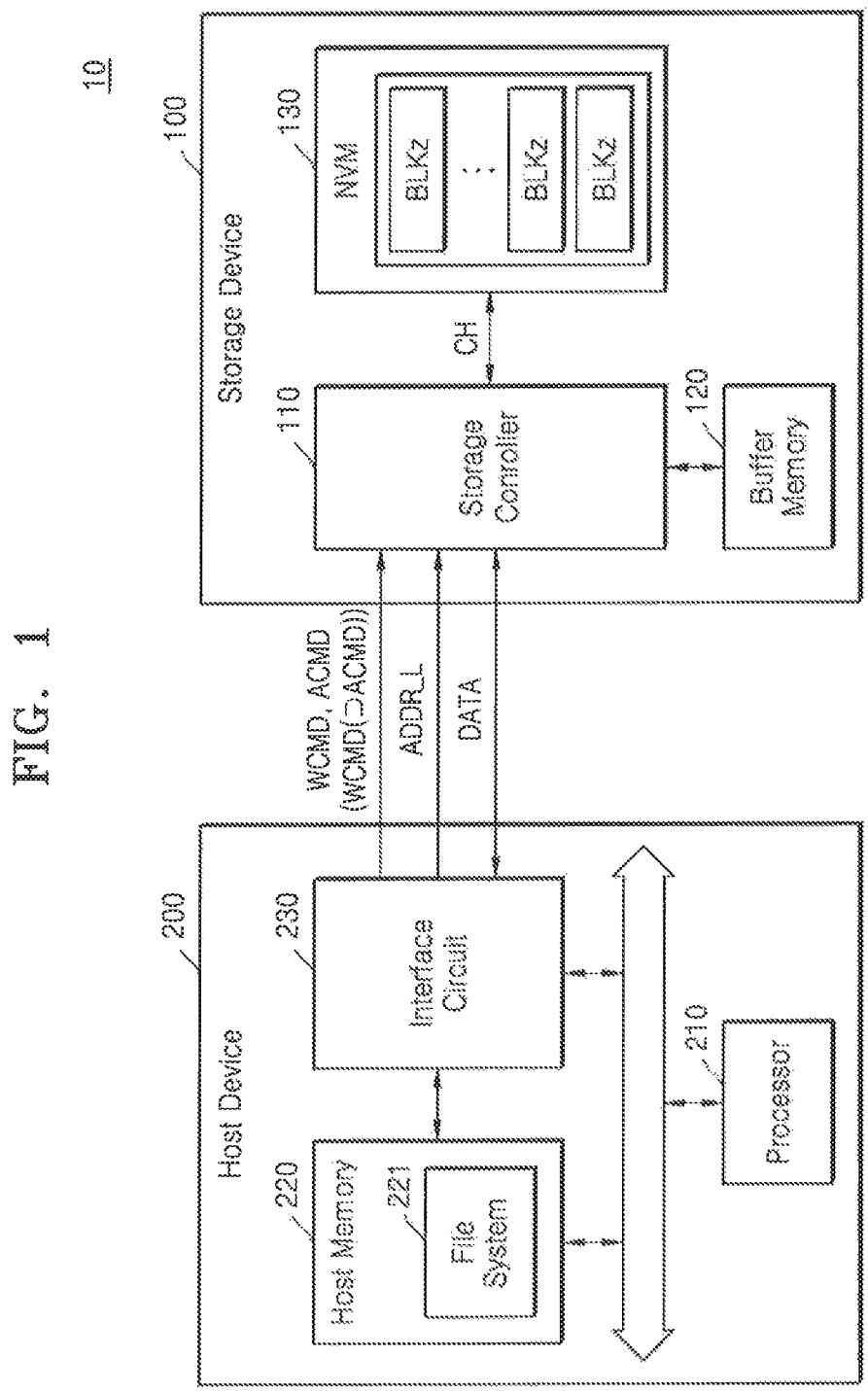
FIG. 1 is a block diagram of a storage system according to an exemplary embodiment of the inventive concept.

FIG. 1 is a block diagram of a storage system 10 according to an exemplary embodiment of the inventive concept.

Referring to FIG. 1, the storage system 10 includes a storage device 100 and a host device 200. The host device 200 may control operations of the storage device 100.

In one embodiment, the storage device 100 may include one or more solid state drives (SSDs). When the storage device 100 includes an SSD, the storage device 100 may include a plurality of flash memory chips (e.g., NAND memory chips) that are non-volatile storages of data.

The storage device 100 may correspond to a flash memory device including one or more flash memory chips. In one embodiment, the storage device 100 may be an embedded memory of the storage system 10. For example, the storage device 100 may be an embedded multi-media card (eMMC) or an embedded universal flash storage (UFS) memory device. In one embodiment, the storage device 100 may be an external memory that is detachably attached to the storage system 10. For example, the storage device 100 may include a UFS memory card, a compact flash (CF), secure digital (SD), micro-SD, mini-SD, extreme digital (xD), or a memory stick.

The host device 200 includes a processor 210, a host memory 220, and an interface circuit 230. The processor 210, the host memory 220, and the interface circuit 230 may transmit and receive signals with each other via an internal bus.

The processor 210 may execute various pieces of software loaded on the host memory 220. For example, the processor 210 may execute an operating system (OS) and application programs. The processor 210 may be provided as a homogeneous multi-core processor or a heterogeneous multi-core processor.

The host memory 220 may be used as a main memory or a cache memory. Alternatively, the host memory 220 may be used as a driving memory for driving software or firmware. Application programs or data that is to be processed by the processor 210 may be loaded on the host memory 220. For example, a file system 221, application programs, or device drivers may be loaded on the host memory 220.

When files or data are stored in the storage device 100, the file system 221 organizes the files or data. The file system 221 may provide the storage device 100 with a logical address ADDR_L according to a command (e.g., a write command WCMD or a read command). The file system 221 may be used according to a certain OS executed in the host device 200.

The host device 200 manages a storage space of the storage device 100 by using the file system 221, writes user data in the storage device 100, and reads user data from the storage device 100. The file system 221 may be implemented via software or firmware.

The interface circuit 230 may be connected to the storage device 100 by converting a data format of commands (e.g., write command WCMD, align command ACMD), a logical address ADDR_L, data DATA corresponding to various access requests issued by the host device 200 or by converting exchanged commands. A protocol of the interface circuit 230 may be at least one of universal serial bus (USB), small computer system interface (SCSI), peripheral component interconnect (PCI) express, advanced technology attachment (ATA), parallel ATA (PATA), serial ATA (SATA), and serial attached SCSI (SAS).

When controlling garbage collection of the storage device 100, the host device 200 may manage the logical address ADDR_L in units of a logical segment. In an exemplary embodiment, the host device 200 transfers an align command ACMD to the storage device 100 to align a logical segment with a physical block address that is a unit of a garbage collection operation in the storage device 100. In one embodiment, the host device 200 provides the storage device 100 with the align command ACMD when a logical address is allocated to a new logical segment. Here, the new logical segment may denote a logical segment to which the logical address is not allocated yet.

In one embodiment, the host device 200 provides the storage device 100 with an align command ACMD that is distinguished from a write command WCMD, in addition to the write command WCMD. In one embodiment, the align command ACMD is included in the write command WCMD and configured as a part of the write command WCMD. For example, the storage controller 110 may be configured to differentiate between the write command WCMD and the align command ACMD.

The storage device 100 may include a storage controller 110 (e.g., a control circuit), a buffer memory 120, and a non-volatile memory 130. The storage device 100 may access the non-volatile memory 130 or may perform requested operations in response to the command provided from the host device 200.

The storage controller 110 may control operations of the non-volatile memory 130 via a channel CH. The storage controller 110 may receive the write command WCMD and the logical address ADDR_L from the host device 200 and may write data DATA in the non-volatile memory 130.

The storage controller 110 may allocate a physical address so that a starting point of the logical segment is aligned with a starting point of a physical block address in response to the align command ACMD. In one embodiment, the storage controller 110 receives the align command ACMD and allocates the physical address that is obtained by converting the logical address ADDR_L received with the align command ACMD to a new physical block address. Here, the new physical block address may be a block address corresponding to a free block in which data is not stored. That is, the new physical block address may denote a physical block address to which a physical address is not allocated yet. For example, a delete operation could have been performed on a block to generate the free block or the block is free because it was never written before. Configurations and operations of the storage controller 110 will be described in detail below with reference to FIG. 2.

The buffer memory 120 may temporarily store write data or read data. The write data temporarily stored in the buffer memory 120 may be written in the non-volatile memory 130, and the read data temporarily stored in the buffer memory 120 may be transferred to the host device 200 via the storage controller 110.

The non-volatile memory 130 may perform writing/reading operations according to a control of the storage controller 110. The non-volatile memory 130 may include a plurality of memory blocks BLK1 to BLKz, each including a plurality of pages. Each of the plurality of pages may include a plurality of memory cells. In one embodiment, the non-volatile memory 130 may perform an erasing operation in units of a memory block and may perform writing or reading operation in units of page.

The physical address may correspond to a certain region in the non-volatile memory 130. For example, a physical address for selecting a page may be a physical page address and a physical address for selecting a memory block may be a physical block address.

In an embodiment, the storage device 100 is configured to perform garbage collection. The storage device 100 may perform the garbage collection in units of a memory block, that is, the erasing unit. Therefore, the storage device 100 may manage the garbage collection in units of physical block address. The garbage collection may include copying all valid pages of a first memory block to a second memory block and performing a delete operation on the first memory block.

In one embodiment, the non-volatile memory 130 may include a plurality of flash memory cells. For example, the plurality of flash memory cells may include NAND flash memory cells. However, one or more embodiments are not limited thereto, that is, the memory cells may include resistive memory cells such as resistive RAM (ReRAM), phase change RAM (PRAM), or magnetic RAM (MRAM).

The storage system 10 according to an exemplary embodiment aligns a logical segment unit of the host device 200 with a physical block address unit of the storage device 100 by using the align command ACMD. In an embodiment, a logical segment unit includes a number of logical addresses that correspond to a same number of physical addresses included in a physical block address unit. In an embodiment, a first logical segment unit is aligned with a first physical block address unit, when a first logical address of the first logical segment unit is mapped to a first physical address of the first physical block address unit, a second logical address of the first logical segment unit is mapped to a second physical address of the first physical block address unit, ..., and an Nth (last) logical address of the first logical segment unit is mapped to an Nth (last) physical address of the first physical address unit. Since the logical segment unit and the physical block address unit are aligned with each other, the number of times the garbage collection is further performed in the storage device 100 may be reduced even though the host device 200 does not control the storage device 100 for performing the garbage collection. Since the number of times of performing unnecessary garbage collections is reduced, the lifespan of the storage device 100 may increase.

Figure 2:
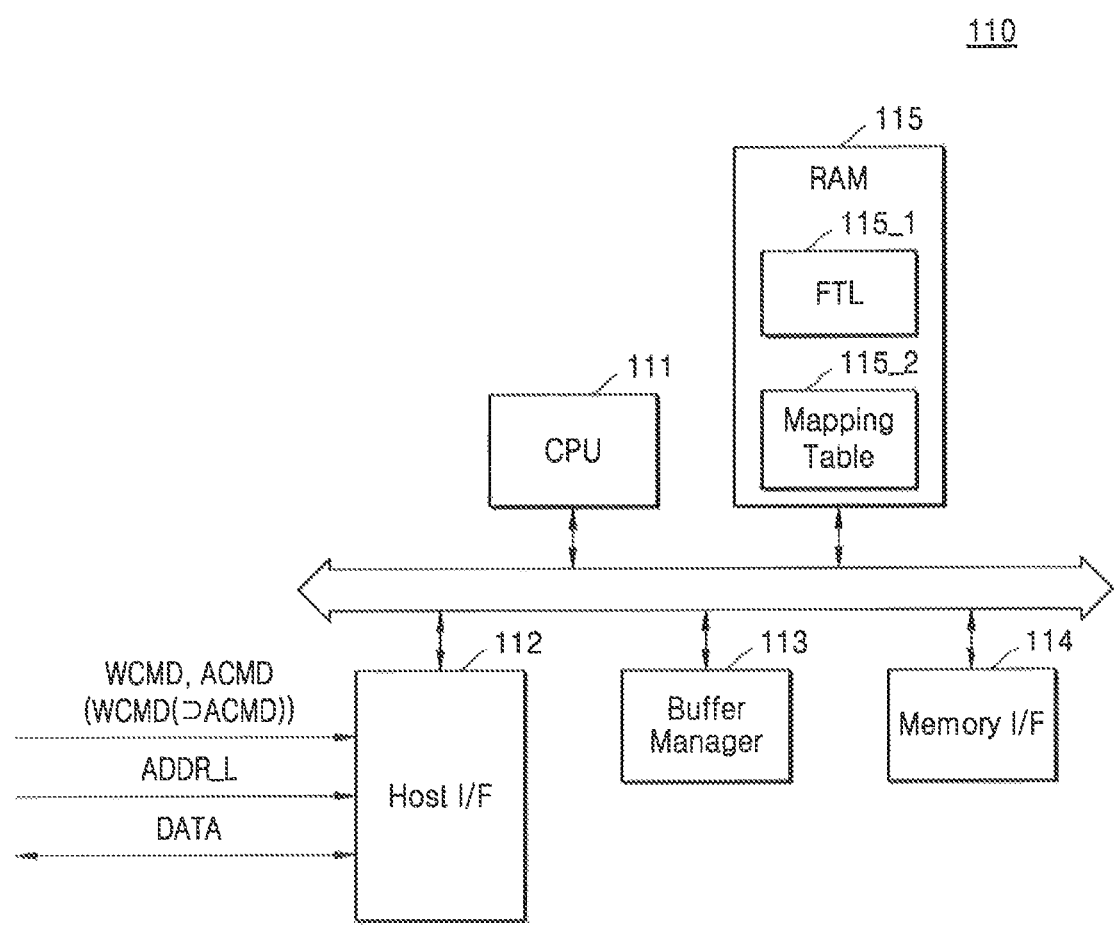
FIG. 2 is a block diagram of an example of a storage controller of FIG. 1.

FIG. 2 is a block diagram of an example of the storage controller 110 of FIG. 1.

Referring to FIG. 1 and FIG. 2, the storage controller 110 may include a central processing unit 111, a host interface 112 (e.g., an interface circuit), a buffer manager 113 (e.g., a manager circuit), a memory interface 114, and RAM 115. The above elements may communicate with one another via a bus, and the storage controller 110 may further include other peripheral devices.

The central processing unit 111 may control all operations of the storage controller 110. The central processing unit 111 may include a central processor or a micro-processor. The central processing unit 111 may execute firmware for driving the storage controller 110. The firmware may be loaded on the RAM 115 and executed. For example, the central processing unit 111 executes the firmware for driving the storage controller 110, so as to execute a garbage collection for managing the non-volatile memory 130 or a flash translation layer (FTL) 115_1 for performing address mapping or wear-leveling.

The host interface 112 may communicate with the host device 200. For example, the host interface 112 may provide a physical connection between the host device 200 and the storage device 100. The host interface 112 may adjust the size of data exchanged with the storage device 100 or may convert the format of a command exchanged with the storage device 100 in response to a bus format of the host device 200.

The bus format of the host device 200 may include at least one of USB, SCSI, PCI express, ATA, PATA, SATA, and SAS. A non-volatile memory express (NVMe) protocol that is used in the host device 200 exchanging the data by PCI express may be applied to the host interface 112.

The buffer manager 113 may control reading and writing operations of the buffer memory 120. For example, the buffer manager 113 may temporarily store the write data or the read data in the buffer memory 120 and may manage a memory area of the buffer memory 120 according to a control of the central processing unit 111.

The memory interface 114 may exchange data DATA with the non-volatile memory 130. The memory interface 114 may write the data DATA transferred from the buffer memory 120 in the non-volatile memory 130 via a channel CH.

The RAM 115 may operate according to a control of the central processing unit 111. The RAM 115 may be used as an operating memory, a cache memory, or a buffer memory of the central processing unit 111. Software or firmware for controlling the storage controller 110 may be loaded on the RAM 115. The RAM 115 may be implemented as a volatile memory such as dynamic random access memory (DRAM) or static RAM (SRAM). Otherwise, the RAM 115 may be implemented as a resistive memory such as RRAM, PRAM, or MRAM. For example, the FTL 115_1 or a mapping table 115_2 may be loaded on the RAM 115.

The FTL 115_1 may include modules for performing various functions. For example, the FTL 115_1 may include an address conversion module that converts the logical address ADDR_L transmitted from the host device 200 into a physical address indicating a storage location in the non-volatile memory 130. In addition, the FTL 115_1 may include modules for performing various background functions with respect to the non-volatile memory, e.g., a module for performing the garbage collection.

The mapping table 115_2 may be operated by the FTL 115_1. The logical address ADDR_L and a corresponding physical address mapping to the logical address ADDR_L may be stored in the mapping table 115_2. Therefore, the FTL 115_1 may convert the logical address ADDR_L via the mapping table 115_2.

In an exemplary embodiment, when the align command ACMD is received via the host interface 112, the central processing unit 111 allocates a physical address to a new physical block address when converting the logical address ADDR_L into the physical address. In one embodiment, the align command ACMD is provided as a separate command from the write command WCMD, and in another embodiment, the align command ACMD is included in the write command WCMD. Therefore, the storage system 10 according to the embodiment may align a logical segment unit that is a unit for managing the logical address in the host device 200 with a physical block address unit that is a unit for managing the physical address in the storage device 100.

Figure 3:
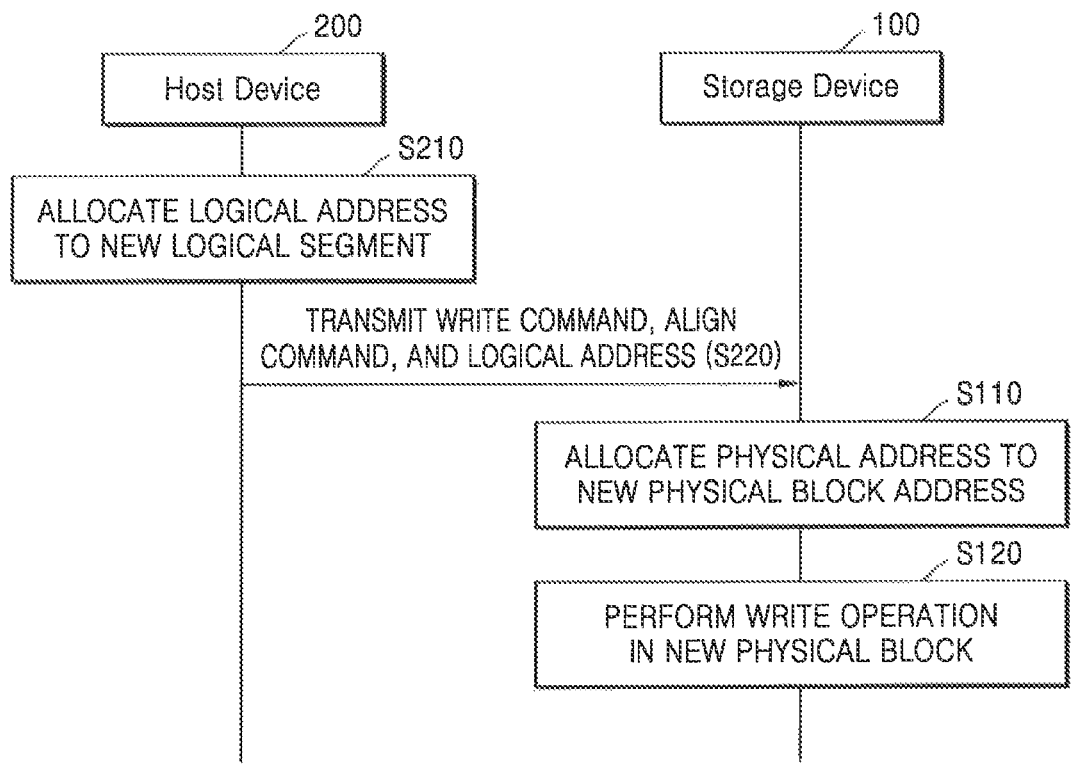
FIG. 3 is a flowchart illustrating a method of operating a storage system, according to an exemplary embodiment of the inventive concept.

FIG. 3 is a flowchart illustrating a method of operating the storage system 10, according to an exemplary embodiment of the inventive concept.

Referring to FIG. 3, in operation S210, the host device 200 allocates a logical address to a new logical segment. Here, the logical segment may be a unit for controlling the garbage collection of the storage device 100 by the host device 200. In an embodiment, allocating a logical address to a new logical segment is performed by assigning a number of available logical addresses to the new logical segment, where the number corresponds to the number of logical addresses within a logical segment and the number of physical addresses within a physical block address.

In operation S220, the host device 200 transmits a write command, an align command, and a logical address to the storage device 100. Here, the align command may be a separate command from the write command or may be included in the write command. In an embodiment, the transmitted logical address is a first logical address assigned to the new logical segment. In another embodiment, the transmitted logical address include all logical addresses within the new logical segment.

In operation S110, the storage device 100 converts the logical address into a physical address and allocates the physical address to a new physical block address. In an embodiment, the conversion and allocation map logical addresses of a logical segment associated with the logical address respectively to physical addresses of the new physical block address. Therefore, a starting point of the logical segment that is a unit for managing the logical address in the host device 200 corresponds to a starting point of the physical block address that is a unit for managing the physical address in the storage device 100.

In operation S120, the storage device 100 may perform a write operation in a new physical block corresponding to the physical block address allocated in operation S110. For example, the write operation may write data to a physical address of the new physical block that is mapped to a logical address of the new logical segment. Here, the storage device 100 may perform the write operation in units of page. For example, if the data includes two pages of data, then the storage device 100 may write a first page of the data to a first page of the physical block at a first time and write a second page of the data to a second page of the physical block at a second time. Examples about each of operations of FIG. 3 will be described below with reference to FIGS. 5 to 7.

Figure 4:
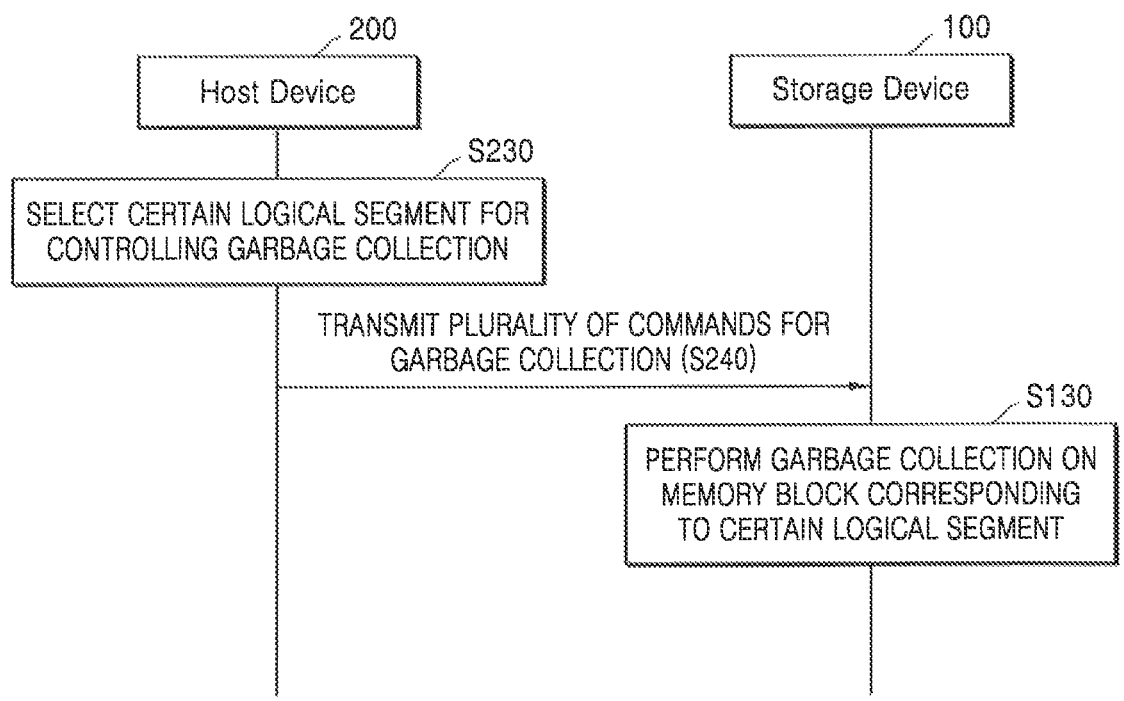
FIG. 4 is a flowchart illustrating a method of operating a storage system, according to an exemplary embodiment of the inventive concept.

FIG. 4 is a flowchart illustrating a method of operating the storage system 10, according to an exemplary embodiment of the inventive concept.

Referring to FIG. 4, in operation S230, the host device 200 selects a certain logical segment in order to control the garbage collection. The host device 200 may control the execution of the garbage collection in units of a logical segment.

In operation S240, the host device 200 transfers a plurality of commands for the garbage collection to the storage device 100 in order for the storage device 100 to perform the garbage collection. The plurality of commands may be transmitted sequentially. For example, the plurality of commands for the garbage collection may include a read command, a write command, and an erase command. The host device 200 may transmit to the storage device 100 the logical address with each of the plurality of commands for the garbage collection. The logical address may correspond to a logical address of the selected logical segment. For example, the logical address transmitted with the erase command may configure the certain logical segment.

The storage device 100 may sequentially receive the plurality of commands for the garbage collection. In operation S130, a garbage collection is performed on a memory block corresponding to the certain logical segment. For example, the storage device 100 may convert the logical address of the certain logical segment into a physical block address and may perform the garbage collection on the memory block corresponding to the physical block address. According to the storage system 10 of the embodiment, the logical segment and the physical block address may be aligned with each other, and the garbage collection may be performed on the memory block corresponding to the certain logical segment.

Although operation S130 is performed after operation S240 in FIG. 4, the storage device 100 may perform operations for the garbage collection in response to each of the plurality of commands sequentially transmitted from the host device 200 in operation S240, and thus operation S240 and operation S130 may be performed in parallel with each other.

The garbage collection operations performed by the storage device 100 may include selecting a sacrificial block from among the plurality of memory blocks (e.g., BLK1 to BLKz in FIG. 1), copying a valid page of the sacrificial block to a free block, and erasing the sacrificial block. The sacrificial block that is erased may be re-used as a free block later.

In the storage system 10 according to the embodiment, the logical segment unit and the physical block address unit are aligned with each other, and thus, the number of times the garbage collection is performed in the storage system 10 may be reduced even when the host device 200 does not control the storage system 10 for the garbage collection. Since the number of times of performing unnecessary garbage collections is reduced, the lifespan of the storage device 100 may increase.

Figure 5:
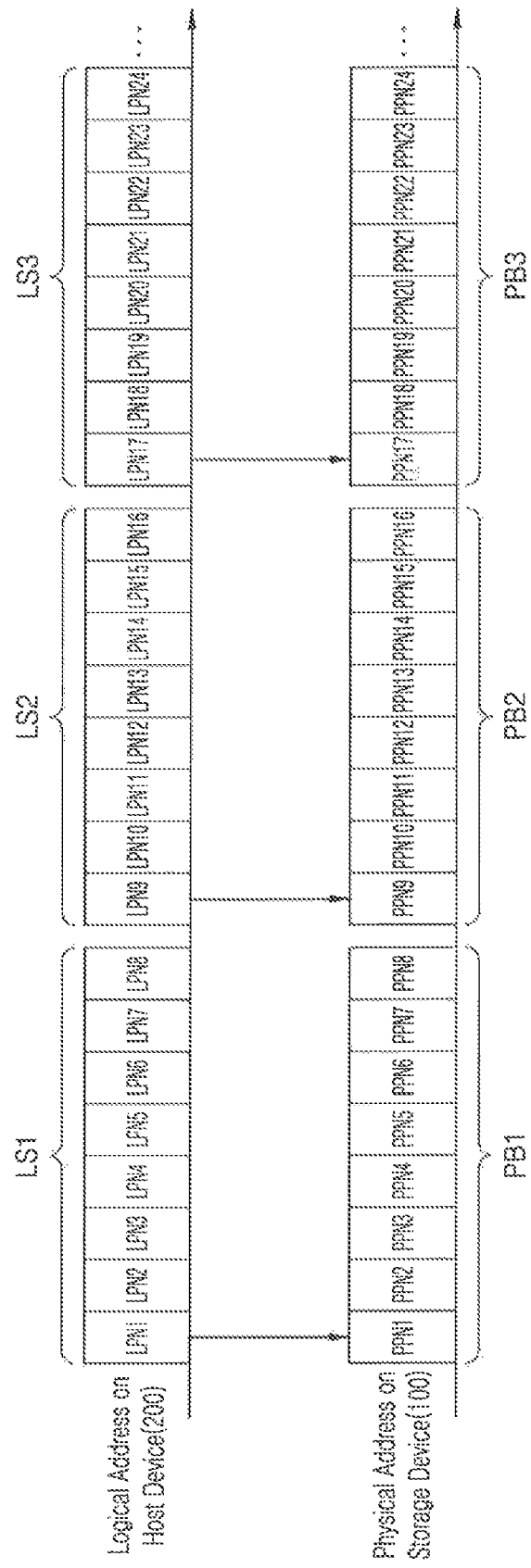
FIGS. 5 to 7 are diagrams of a logical segment and a physical block address for illustrating the method of operating the storage system of FIG. 3.

FIG. 5 is a diagram of a logical segment and a physical block address for illustrating the method of operating the storage system 10 of FIG. 3. FIG. 5 is a conceptual diagram showing partitioned regions of a logical address in the host device 200 and partitioned regions of a physical address in the storage device 100.

Referring to FIG. 5, the storage system 10 may perform memory allocation in a log-structured way. Therefore, allocation of the logical address in the host device 200 and allocation of the physical address in the storage device 100 may be performed in the log-structured system. For example, first to twenty-fourth logical page addresses LPN1 to LPN24 may be sequentially allocated and first to twenty-fourth physical page addresses PPN1 to PPN24 may be sequentially allocated. The first to twenty-fourth logical page addresses LPN1 to LPN24 may respectively correspond to the first to twenty-fourth physical page addresses PPN1 to PPN24. For example, the first logical page address LPN1 may correspond to the first physical page address PPN1, the second logical page address LPN2 may correspond to the second physical page address PPN2, and the twenty-fourth logical page address LPN24 may correspond to the twenty-fourth physical page address PPN24. In one embodiment, each of the first to twenty-fourth physical page addresses PPN1 to PPN24 may correspond to one page of a non-volatile memory (e.g., 130) of the storage device 100.

The first to eighth logical page addresses LPN1 to LPN8 may configure a first logical segment LS1, the ninth to sixteenth logical page addresses LPN9 to LPN16 may configure a second logical segment LS2, and the seventeenth to twenty-fourth logical page addresses LPN17 to LPN24 may configure a third logical segment LS3. In FIG. 5, one logical segment includes eight logical page addresses, but the host device 200 according to embodiments of the inventive concept is not limited thereto, that is, the number of logical page addresses included in one logical segment may vary.

The host device 200 may transmit an align command to the storage device 100 (S220) at a time point when each of the first logical segment LS1, the second logical segment LS2, and the third logical segment LS3 is newly allocated, that is, a time point where each of the first to third logical segments LS1 to LS3 starts. For example, the host device 200 may transmit the align command together with the first logical page address LPN1, the ninth logical page address LPN9, and the seventeenth logical page address LPN17 to the storage device 100. However, the host device 200 according to embodiments of the inventive concept is not limited to the transmission of the align command whenever the logical segment starts, but the host device 200 may selectively transmit the align command at the points where the logical segments start.

The first to eighth physical page addresses PPN1 to PPN8 may configure a first physical block address PB1, the ninth to sixteenth physical page addresses PPN9 to PPN16 may configure a second physical block address PB2, and the seventeenth to twenty-fourth physical page addresses PPN17 to PPN24 may configure a third physical block address PB3. In one embodiment, each of the first to third physical block addresses PB1 to PB3 may correspond to one memory block (e.g., one of BLK1 to BLKz) in the non-volatile memory (e.g., 130) of the storage device 100. For example, the first physical block address PB1 may correspond to the first memory block BLK1, the second physical block address PB2 may correspond to the second memory block BLK2, and the third physical block address PB3 may correspond to the third memory block BLK3.

According to the align command, the first logical segment LS1 may be aligned with the first physical block address PB1, the second logical segment LS2 may be aligned with the second physical block address PB2, and the third logical segment LS3 may be aligned with the third physical block address PB3. In FIG. 5, one physical block address includes eight physical page addresses, but the storage device 100 according to embodiments of the inventive concept is not limited thereto, that is, the number of physical page addresses included in one physical block address may vary. In one embodiment, the number of physical page addresses included in one physical block address may correspond to the number of logical page addresses included in one logical segment. For example, the number of physical page addresses included in one physical block address may be n-times greater than the number of logical page addresses included in one logical segment. Here, n is 1 or greater natural number.

The host device 200 according to an embodiment transmits the align command at a point where the logical segment newly starts to maintain an aligned state between the logical segment and the corresponding physical block address. That is, the logical segment that is a unit of the garbage collection performed in the host device 200 may be aligned with the physical address that is a unit of the garbage collection performed in the storage device 100.

Figure 6:
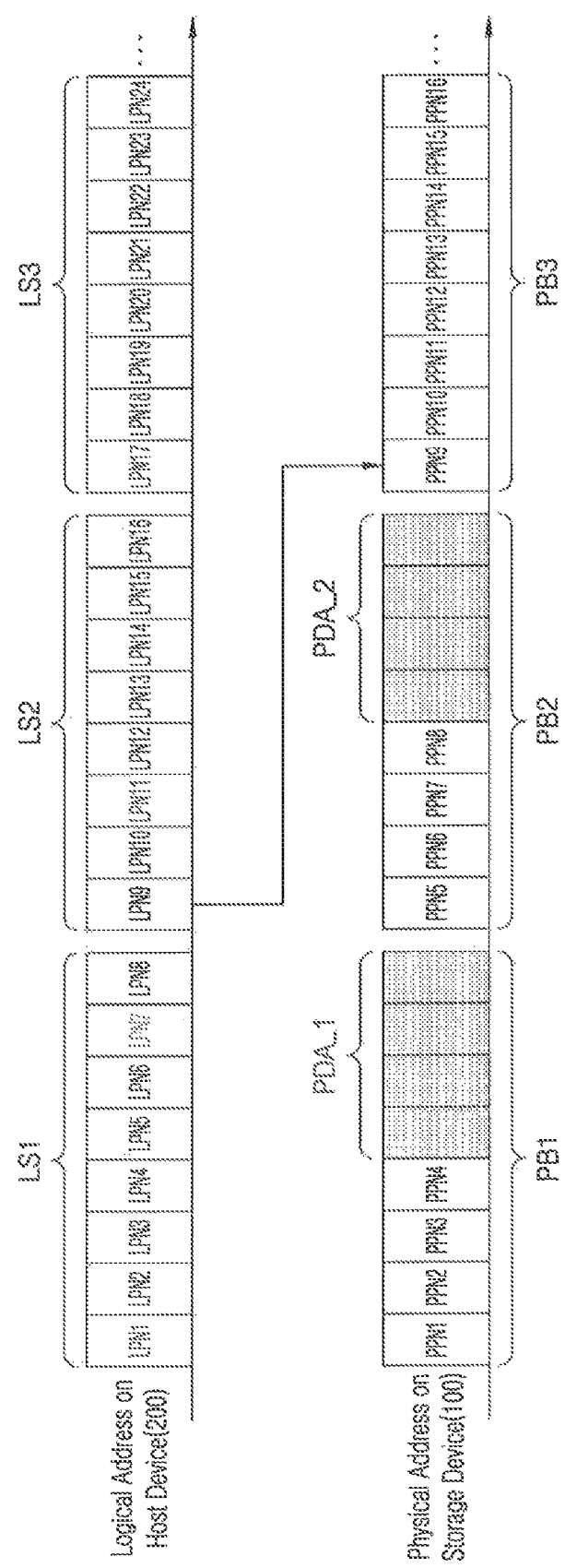
Figure 7:
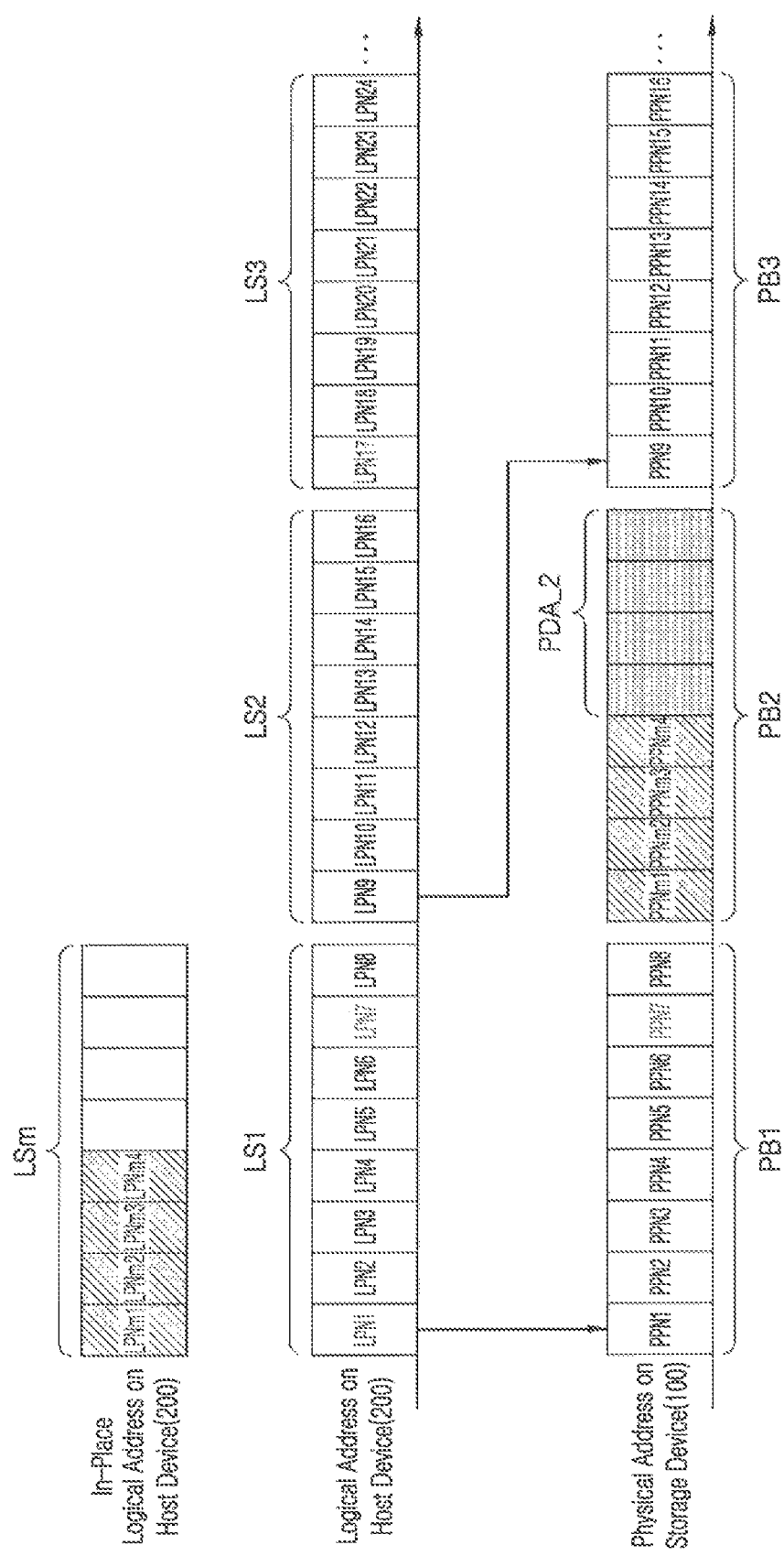

FIGS. 6 and 7 are diagrams of logical segments and physical block addresses for illustrating a method of operating the storage system 10 of FIG. 3. FIGS. 6 and 7 are diagrams showing recovering the aligned state when there is a misalignment between the logical segment and the physical block address, unlike the example of FIG. 5.

Referring to FIG. 6, the storage device 100 may sequentially allocate first to fourth physical block addresses PPN1 to PPN4 to the first physical block address PB1. After that, an internal event occurs in the non-volatile memory 130 of the storage device 100, and a first physical dummy region is generated in a certain memory block (e.g., the first memory block BLK1 of FIG. 1). Therefore, a first physical dummy address region PDA_1 is generated in the first physical block address PB1. For example, when a programming operation fails in the first memory block BLK1 or data to be stored in the first memory block BLK1 migrates to another memory block, the first physical dummy address region PDA_1 is generated in the first physical block address PB1 corresponding to the first memory block BLK1. In FIG. 6, the first physical dummy address region PDA_1 is shown to include four physical addresses, but is not limited thereto, that is, the number of physical addresses corresponding to the first physical dummy address region PDA_1 may vary.

Since the first physical dummy address region PDA_1 is generated in the first physical block address PB1, the fifth to eighth physical page addresses PPN5 to PPN8 are not allocated to the first physical block address PB1, but are allocated to the second physical block address PB2. The first logical segment LS1 and the first physical block address PB1 are thus misaligned with each other.

In an embodiment, the host device 200 transmits an align command to the storage device 100 at a point where the second logical segment LS2 starts, that is, when the ninth logical page address LPN9 is allocated to the second logical segment LS2. For example, the host device 200 may transmit the align command to the storage device 100 together with the ninth logical page address LPN9.

The storage device 100 may allocate the ninth physical page address PPN9 obtained by converting the ninth logical page address LPN9 to the third physical block address PB3, that is, a new physical block address, in response to the align command. For example, the new physical block address may identify a free block. Therefore, the second logical segment LS2 is aligned with the third physical block address PB3 and the aligned state between the logical segment of the host device 200 and the physical block address of the storage device 100 is recovered.

Due to the align operation of the storage device 100, a second physical dummy address region PDA_2 may be generated in the second physical block address PB2. In the non-volatile memory, a second physical dummy region may be generated in a memory block (e.g., the second memory block BLK2) corresponding to the second physical dummy address region PDA_2. For example, since part of the memory block associated with the second physical block address PB2 was already written, and a remainder of the memory block was skipped so the second logical segment LS2 could be aligned with the first physical block address PB3, the second physical dummy address region PDA_2 may be generated in the remainder.

Referring to FIG. 7, the host device 200 may manage some of the data by using the log-structured system and may manage some other data in a separate region. For example, user data may be managed in the log-structured system, and metadata generated due to the user data may be managed in a separate region. Accordingly, the host device 200 may manage the logical address in the log-structured system (appended) or in an exceptional way of the log-structure system (in-place).

The host device 200 may sequentially allocate the first to eighth logical page addresses LPN1 to LPN8 that are managed in the log-structured way to the first logical segment LS1. The storage device 100 receives the first to eighth logical page addresses LPN1 to LPN8 from the host device 200 and may allocate the first to eighth physical page addresses PPN1 to PPN8 corresponding to the first to eighth logical page addresses LPN1 to LPN8 sequentially to the first physical page address PB1.

After that, the host device 200 may allocate a plurality of logical page addresses LPNm1 to LPNm4 that are managed in the exceptional way of the log-structure system (In-place) to an exception logical segment LSm. The storage device 100 storing the data in the log-structured system receives a plurality of logical page addresses LPNm1 to LPNm4 from the host device 200 and may sequentially allocate a plurality of physical page addresses PPNm1 to PPNm4 to the second physical block address PB2.

The host device 200 may sequentially allocate the ninth to sixteenth logical page addresses LPN9 to LPN16 managed in the log-structured system to the second logical segment LS2. The host device 200 may transmit an align command to the storage device 100 at a point where the second logical segment LS2 starts, that is, when the ninth logical page address LPN9 is allocated to the second logical segment LS2. The storage device 100 may allocate the ninth physical page address PPN9 obtained by converting the ninth logical page address LPN9 to the third physical block address PB3, that is, a new physical block address, in response to the align command. Therefore, the second logical segment LS2 may be aligned with the third physical block address PB3.

Due to the align operation of the storage device 100, the second physical dummy address region PDA_2 may be generated in the second physical block address PB2. In the non-volatile memory, the second physical dummy region may be generated in a memory block (e.g., the second memory block BLK2) corresponding to the second physical dummy address region PDA_2.

Referring to FIGS. 6 and 7, in the storage system 10 according to an embodiment of the inventive concept, even when a misalignment occurs due to the storage device 100 or due to the host device 200, the host device 200 provides an align command to recover the aligned state. FIGS. 5 and 6 show an exemplary situation, and the method of operating the storage system 10 according to the embodiment may be used in a misalignment situation that is not shown in the drawings.

Figure 8:
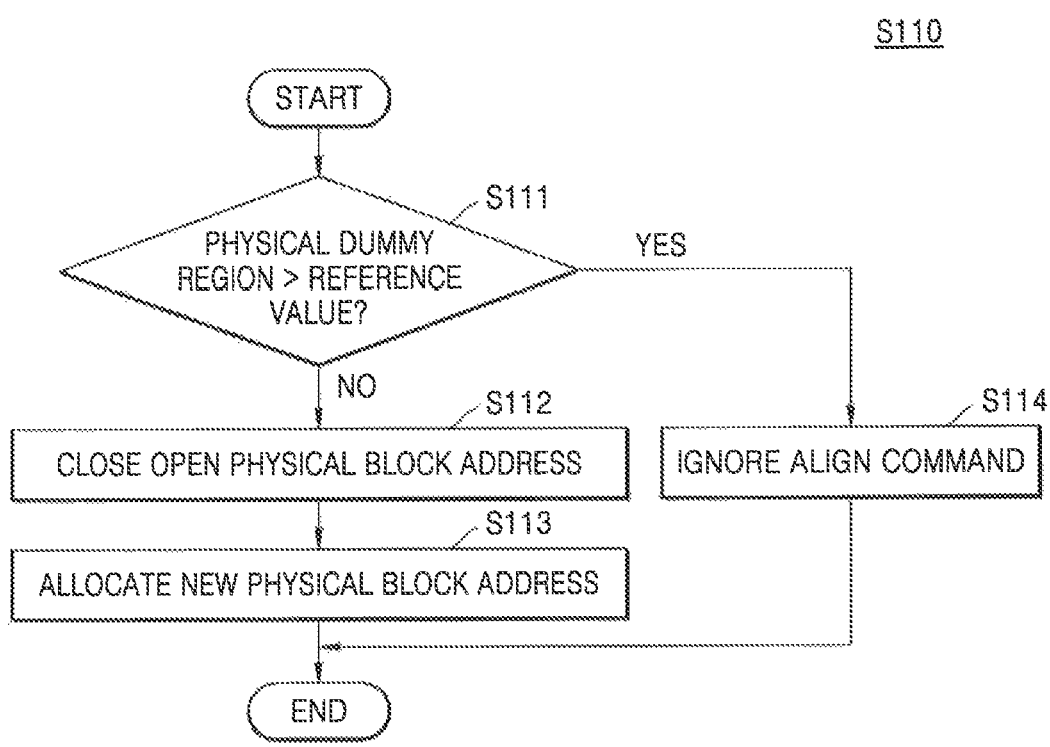
FIG. 8 is a flowchart illustrating a method of operating a storage system, according to an exemplary embodiment of the inventive concept.

FIG. 8 is a flowchart illustrating a method of operating the storage system 10, according to an exemplary embodiment of the inventive concept. FIG. 8 is a flowchart illustrating an example of operation S110 in FIG. 3.

Referring to FIG. 8, in operation S111, the storage device 100 determines whether a size of a physical dummy region included in the non-volatile memory of the storage device 100 exceeds a reference value. In one embodiment, the physical dummy region may include a first physical dummy region of FIG. 6 (e.g., a region indicated by the first physical dummy address region PDA_1) and a second physical dummy region (e.g., a region indicated by the second physical dummy address region PDA_2) and may include a second physical dummy region of FIG. 7 (e.g., a region indicated by the second physical dummy address region PDA_2). That is, the physical dummy regions may include the first physical dummy region due to an internal issue in the non-volatile memory and the second physical dummy region due to the align operation of the storage device 100.

In one embodiment, the reference value may be related to a ratio of a size of the physical dummy region in which the data is not written with respect to a size of a region in which the data is written, in a total storage space of the non-volatile memory. For example, the reference value may be determined so that the ratio between the size of the physical dummy region in which the data is not written and the size of the region in which the data is written may be maintained at a certain level or less in the total storage space of the non-volatile memory. That is, as the region in which the data is written in the non-volatile memory increases, the reference value may also increase. An upper limit of the ratio of the size of the physical dummy region in which the data is not written with respect to the size of the region in which the data is written may be determined in advance.

When the physical dummy region does not exceed the reference value, the storage device 100 performs operation S112. In operation S112, the storage device 100 closes the physical block address that has been allocated in a previous operation, that is, closes the open physical block address. Accordingly, in the memory block corresponding to the closed physical block address, a write operation is not further performed.

In operation S113, the storage device 100 allocates a physical address to a new physical block address. For example, the storage device 100 may allocate a first physical page address (e.g., PPN1 of FIG. 5) to a first physical block address (e.g., PB1 of FIG. 5). Therefore, a starting point of the logical segment that is a unit for managing the logical address in the host device 200 may correspond to a starting point of the physical block address that is a unit for managing the physical address in the storage device 100.

When the physical dummy region exceeds the reference value, the storage device 100 performs operation S114. In operation S114, the storage device 100 ignores the align command. The storage device 100 may allocate a physical address in succession to the physical block address allocated in the previous operation, that is, open a physical block address.

The storage system 10 according to at least one embodiment may take into account the storage space of the non-volatile memory in the storage device 100, when performing an operation of aligning the logical segment with the physical block address. Therefore, the physical dummy region in which the data is not written may be prevented from excessively increasing in size, simultaneously with aligning of the garbage collection unit of the host device 200 with the garbage collection unit of the storage device 100.

Figure 9:
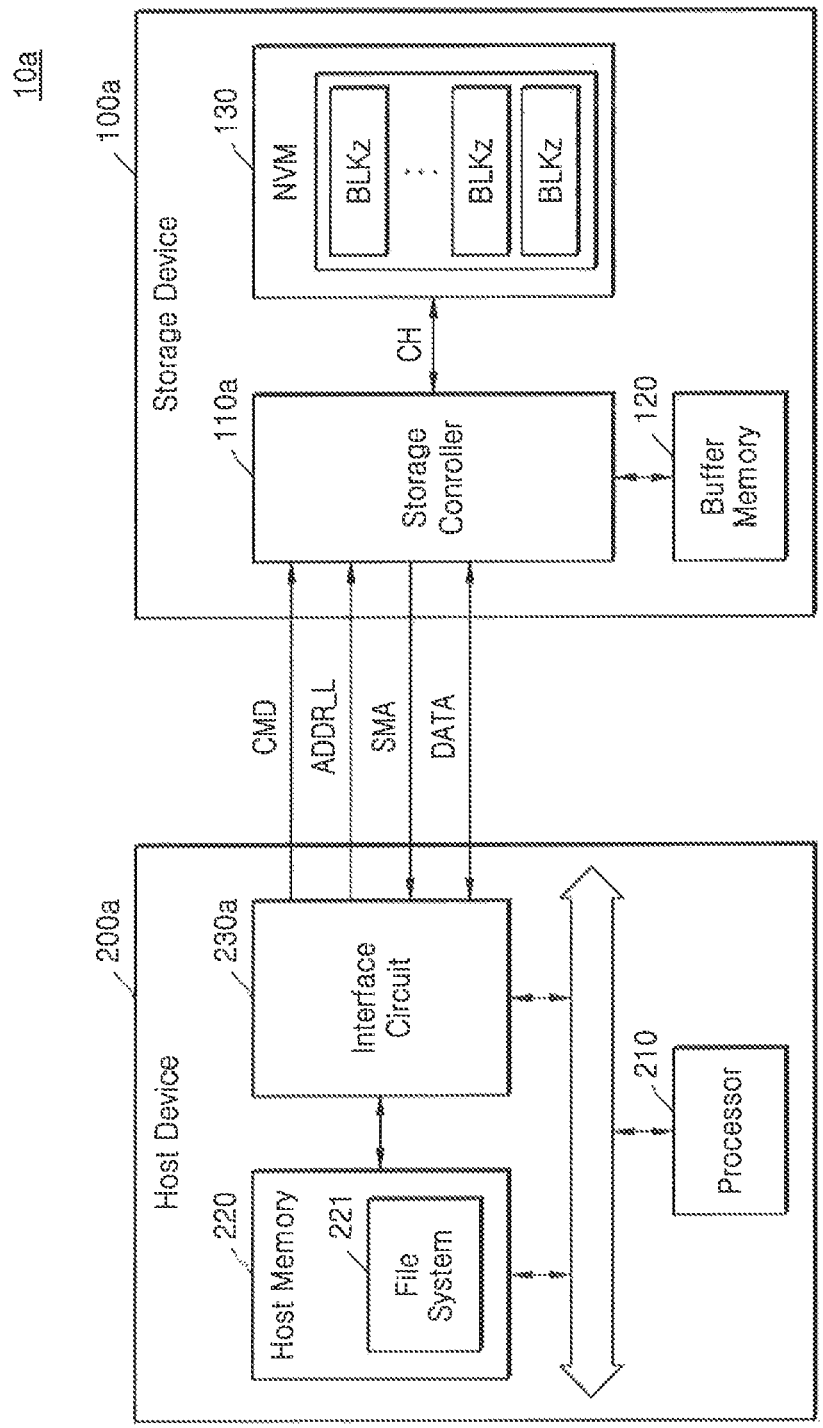
FIG. 9 is a block diagram of a storage system according to an exemplary embodiment of the inventive concept.

FIG. 9 is a block diagram of a storage system 10a according to an exemplary embodiment of the inventive concept. In FIG. 9, detailed descriptions about the same elements as those of FIG. 1 will be omitted.

Referring to FIG. 9, the storage system 10a includes a storage device 100a and a host device 200a. The host device 200a may control operations of the storage device 100a.

The host device 200a includes the processor 210, the host memory 220, and an interface circuit 230a. The host device 200a may manage the logical address ADDR_L in units of a logical segment when controlling garbage collection of the storage device 100a.

In an exemplary embodiment, when receiving a misalignment signal SMA from the storage device 100a via the interface circuit 230a, the host device 200a performs an align operation for aligning a logical segment of the host device 200a with a physical block address of the storage device 100a. In one embodiment, the host device 200a may allocate a logical address to a new logical segment, or the host device 200a may ensure a logical dummy region based on the misalignment signal SMA. The align operation of the host device 200a will be described below with reference to FIGS. 10 and 11.

The storage device 100a includes a storage controller 110a (e.g., a control circuit), the buffer memory 120, and the non-volatile memory 130. The storage device 100a may access the non-volatile memory 130 or may perform requested operations in response to a command CMD provided from the host device 200a. Configurations and operations of the storage controller 110a of FIG. 9 may be similar to those of the storage controller 110 of FIG. 2.

The storage device 100a may perform garbage collection. The storage device 100a may perform the garbage collection in units of a memory block, that is, an erasing unit, and may manage the physical address in units of a physical block address to correspond to the memory block. In an exemplary embodiment, when a logical segment of the host device 200a is misaligned with a physical block address of the storage device 100a, the storage device 100a transfers a misalignment signal SMA for notifying of the misaligned state to the host device 200a.

When the logical segment is misaligned with the physical block address due to the storage device 100a, the storage system 10a according to the embodiment generates the misalignment signal SMA so that the logical segment unit and the physical block address unit may be aligned with each other. Therefore, even when the host device 200a does not control the storage device 100a for the garbage collection, the number of times the garbage collection is separately performed in the storage device 100a may be reduced.

Figure 10:
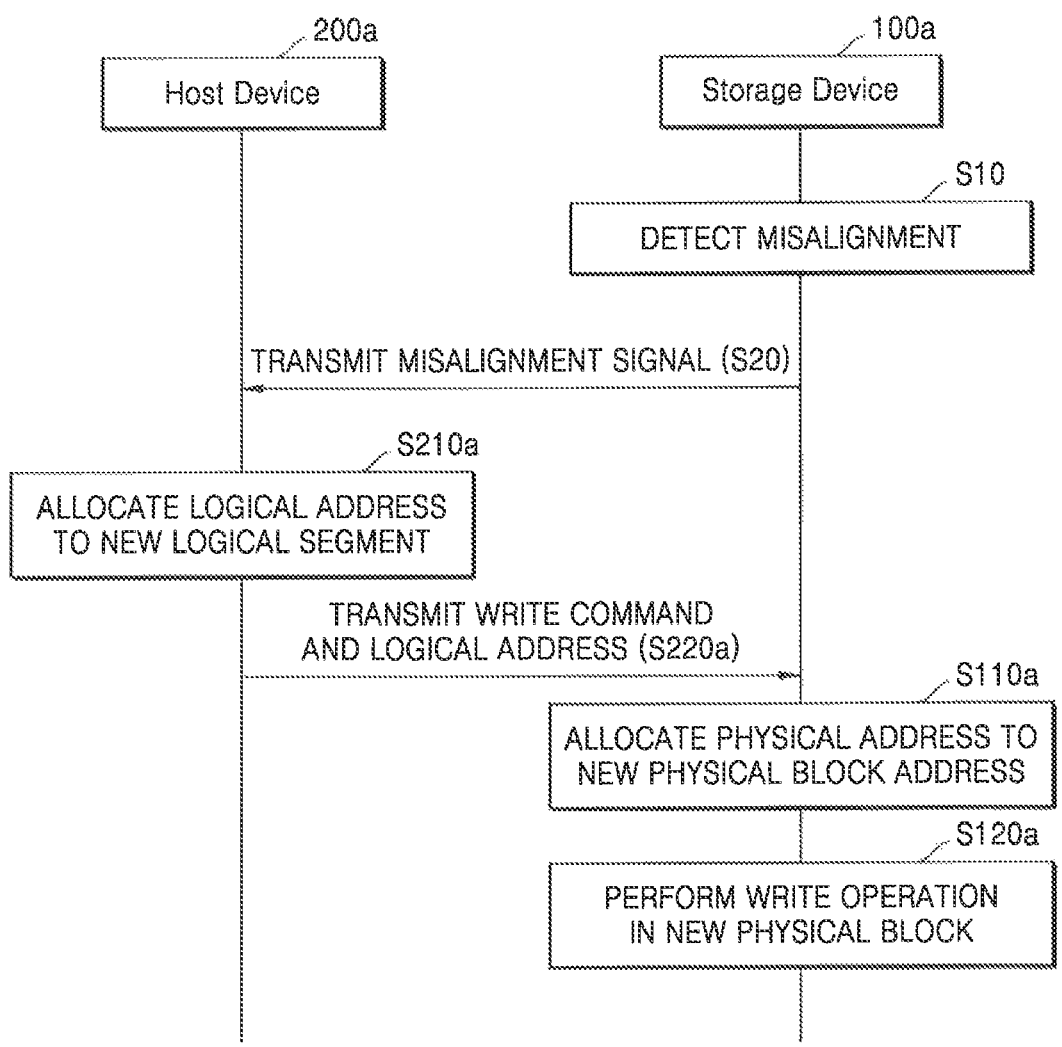
FIG. 10 is a flowchart illustrating a method of operating a storage system, according to an exemplary embodiment of the inventive concept.

FIG. 10 is a flowchart illustrating a method of operating the storage system 10a, according to an exemplary embodiment of the inventive concept.

Referring to FIG. 10, a physical block address of the storage device 100a may be misaligned with a logical segment of the host device 200a, and in operation S10, the storage device 100a may detect the misalignment. For example, the storage device 100a may generate a physical dummy address region when allocating the physical address. For example, when a programming operation fails in a first memory block (e.g. BLK1 of FIG. 9) or data to be stored in the first memory block BLK1 migrates to another memory block, a physical dummy address region may be generated in a first physical block address corresponding to the first memory block BLK1 and misalignment may occur.

In operation S20, the storage device 100a transmits the misalignment signal SMA to the host device 200a. In one embodiment, the misalignment signal SMA includes information about whether the misalignment occurs.

In operation S210a, the host device 200a receives the misalignment signal SMA and detects occurrence of the misalignment, and then allocates a logical address to a new logical segment. In operation S220a, the host device 200a transmits a write command and the logical address to the storage device 100a. For example, the logical address may be a first logical address of the new logical segment. In one embodiment, unlike the example shown in FIG. 10, the host device 200a may additionally transmit an align command to the storage device 100a together with the write command. Here, the align command may be a command that is provided to the storage device 100a separately from the write command, or may be included in the write command.

In operation S110a, the storage device 100a converts the logical address into a physical address and allocates the physical address to a new physical block address. Therefore, a starting point of the logical segment that is a unit for managing the logical address in the host device 200a may correspond to a starting point of the physical block address that is a unit for managing the physical address in the storage device 100a.

In operation S120a, the storage device 100a performs a write operation in a new physical block corresponding to the physical block address allocated in operation S110a.

Figure 11:
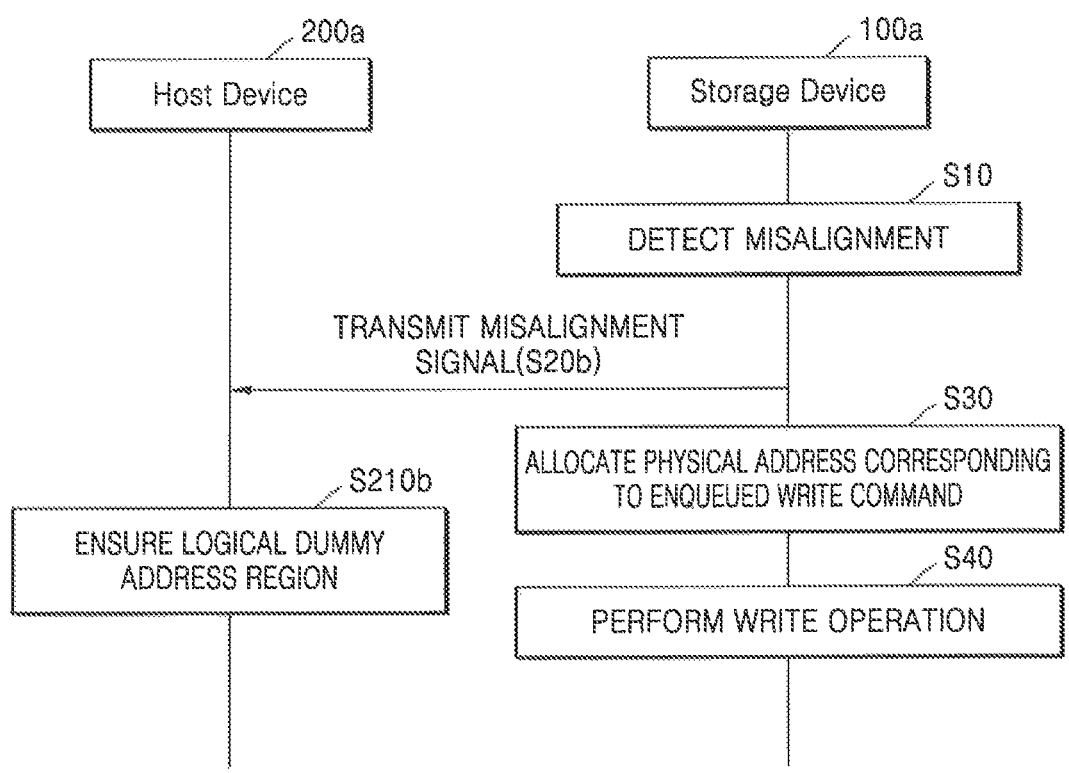
FIG. 11 is a flowchart illustrating a method of operating a storage system, according to an exemplary embodiment of the inventive concept.
Figure 12:
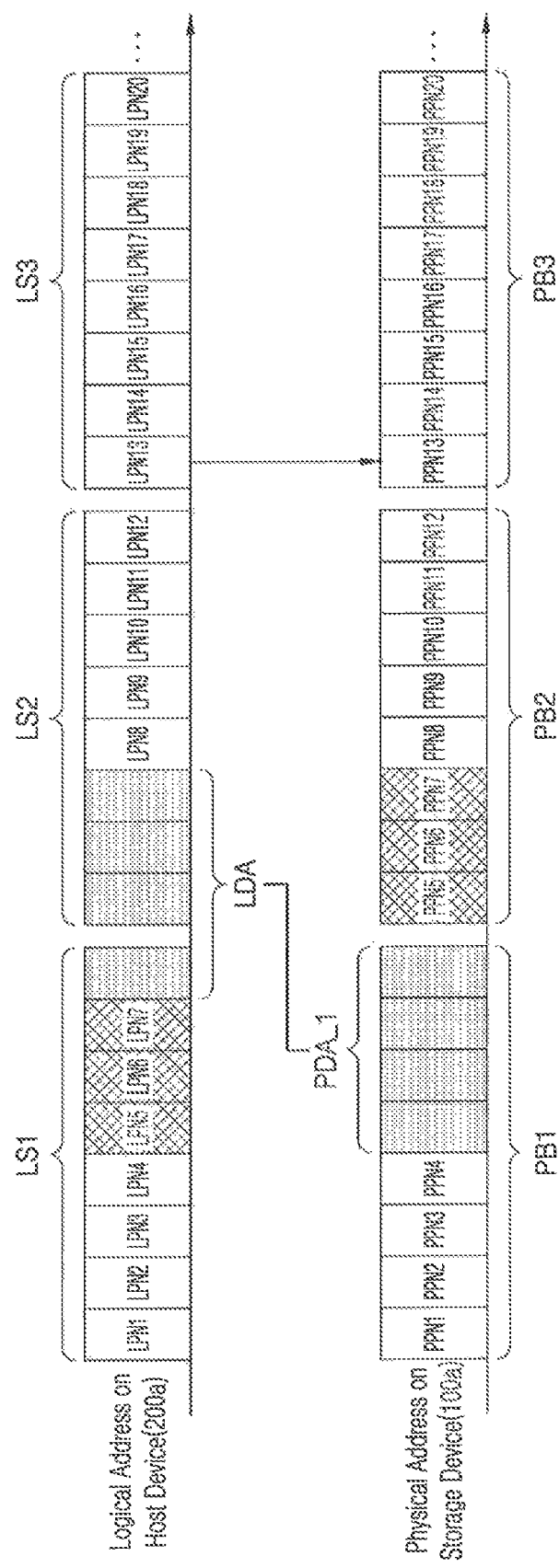
FIG. 12 is a diagram of a logical segment and a physical block address for illustrating the method of operating the storage system of FIG. 11.

FIG. 11 is a flowchart illustrating a method of operating the storage system 10a, according to an exemplary embodiment of the inventive concept. FIG. 12 is a diagram of a logical segment and a physical block address for illustrating the method of operating the storage system 10a of FIG. 11. FIG. 12 is a conceptual diagram showing partitioned regions of a logical address in the host device 200a and partitioned regions of a physical address in the storage device 100a.

Referring to FIGS. 11 and 12, the physical block address of the storage device 100a is misaligned with the logical segment of the host device 200a, and in operation S10, the storage device 100a detects the misalignment. For example, although the host device 200a transmits the write command and the fifth to seventh logical page addresses LPN5 to LPN7, a write operation is not performed in a first memory block (e.g., the first memory block BLK1 of FIG. 9) corresponding to the first physical block address PB1 due to a cause generated in the storage device 100a. Accordingly, the first physical dummy address region PDA_1 corresponding to pages in which the write operation is not performed is generated in the first physical block address PB1, and the storage device 100a detects that the misalignment occurs.

In operation S20b, the storage device 100a transmits a misalignment signal (e.g., SMA of FIG. 9) to the host device 200a. In one embodiment, the misalignment signal SMA includes information about a size of the physical dummy address region causing the misalignment. For example, the misalignment signal SMA may include size information indicating that the first physical dummy address region PDA_1 includes four physical page addresses.

In operation S210b, the host device 200a secures a logical dummy address region based on the size information of the physical dummy address region included in the misalignment signal SMA. In one embodiment, the host device 200a secures the logical dummy region to correspond to the size of the physical dummy address region. For example, based on the size information indicating that the first physical dummy address region PDA_1 includes four physical page addresses, the host device 200a may secure a logical dummy address region LDA including four logical page addresses. For example, the logical dummy address region LDA may fill a remaining portion of the first logical segment LS1 and part of a second logical segment LS2.

According to operation S210b in the host device 200a, the third logical segment LS3 is aligned with the third physical block address PB3, and the aligned state between the logical segment of the host device 200a and the physical block address of the storage device 100a is recovered. Here, the logical dummy address region is a conceptual dummy region, and thus the dummy region may not be actually generated in the memory device.

In operation S30, the storage device 100a allocates a physical address corresponding to an enqueued write command in succession to the physical dummy address region. That is, the write operation that has not been performed may be continuously performed. For example, since the storage device 100a has not performed the write operation on each of the fifth to seventh logical page addresses LPN5 to LPN7, write commands corresponding to the fifth to seventh logical page addresses LPN5 to LPN7 may be enqueued in a command queue of the memory controller of the storage device 100a. Therefore, the storage device 100a may allocate the fifth to seventh physical page addresses PPN5 to PPN7 that are obtained by converting the fifth to seventh logical page addresses LPN5 to LPN7, in succession to the first physical dummy address region PDA_1.

In operation S40, the storage device 100a performs the write operation in a region corresponding to the physical address allocated in operation S30. For example, data may be written in pages corresponding to the fifth to seventh physical page addresses PPN5 to PPN7. In one embodiment, operation S30 and operation S40 performed by the storage device 100a may be performed in parallel with operation S210b performed by the host device 200a.

When a misalignment occurs, the storage device 100a according to the embodiment provides the host device 200a with the misalignment signal SMA including the size information of the physical dummy address region so that the logical dummy address region LDA corresponding to the physical dummy address region may be ensured. Therefore, when the storage device 100a allocates the physical address to a new physical block address in order to align the logical segment with the physical block address, additional generation of the physical dummy address region may be prevented. The storage system according to the embodiment may align the garbage collection unit of the host device 200a with the garbage collection unit of the storage device 100a, and at the same time, may prevent the physical dummy region in which the data is not written from excessively increasing in size.

Figure 13:
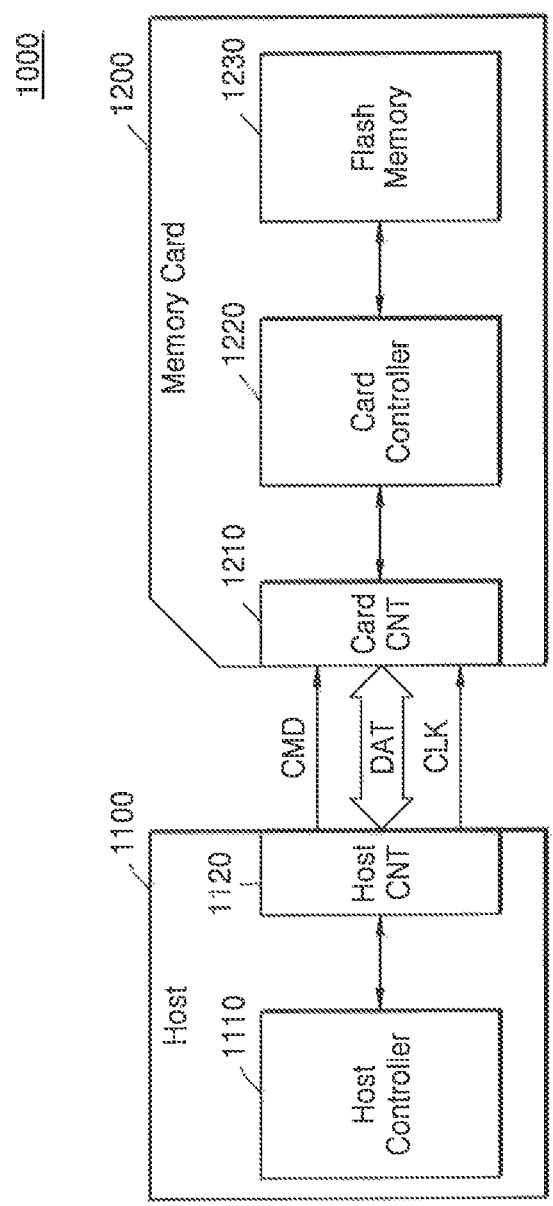
FIG. 13 is a diagram illustrating an example, in which a storage device of a user device according to an embodiment is applied to a memory card.

FIG. 13 is a diagram illustrating an example, in which a storage device of a user device according to an embodiment is applied to a memory card.

Referring to FIG. 13, a memory card system 1000 includes a host 1100 (e.g., a host device) and a memory card 1200. The memory card system 1000 may be the storage system 10 or 10a shown in FIG. 1 or FIG. 9, the host 1100 may be the host device 200 or 200a shown in FIG. 1 or FIG. 9, and the memory card 1200 may be the storage device 100 or 100a shown in FIG. 1 or FIG. 9.

The host 1100 includes a host controller 1110 (e.g., a control circuit) and a host connection unit 1120 (e.g., a connection circuit). The memory card 1200 includes a card connection unit 1210 (e.g., a connection circuit), a card controller 1220 (e.g., a control circuit), and a flash memory 1230.

The host 1100 may write data in the memory card 1200 or read the data stored in the memory card 1200. The host controller 1110 may transmit a command (e.g., a write command), a clock signal CLK generated by a clock generator in the host 1100, and data DAT to the memory card 1200 via the host connection unit 1120.

The card controller 1220 may store the data DAT in the flash memory 1230 in synchronization with a clock signal CLK generated by a clock generator in the card controller 1220, in response to the write command transmitted through the card connection unit 1210. The flash memory 1230 may store the data DAT transmitted from the host 1100. For example, when the host 1100 is a digital camera, the flash memory 1230 may store image data.

Figure 14:
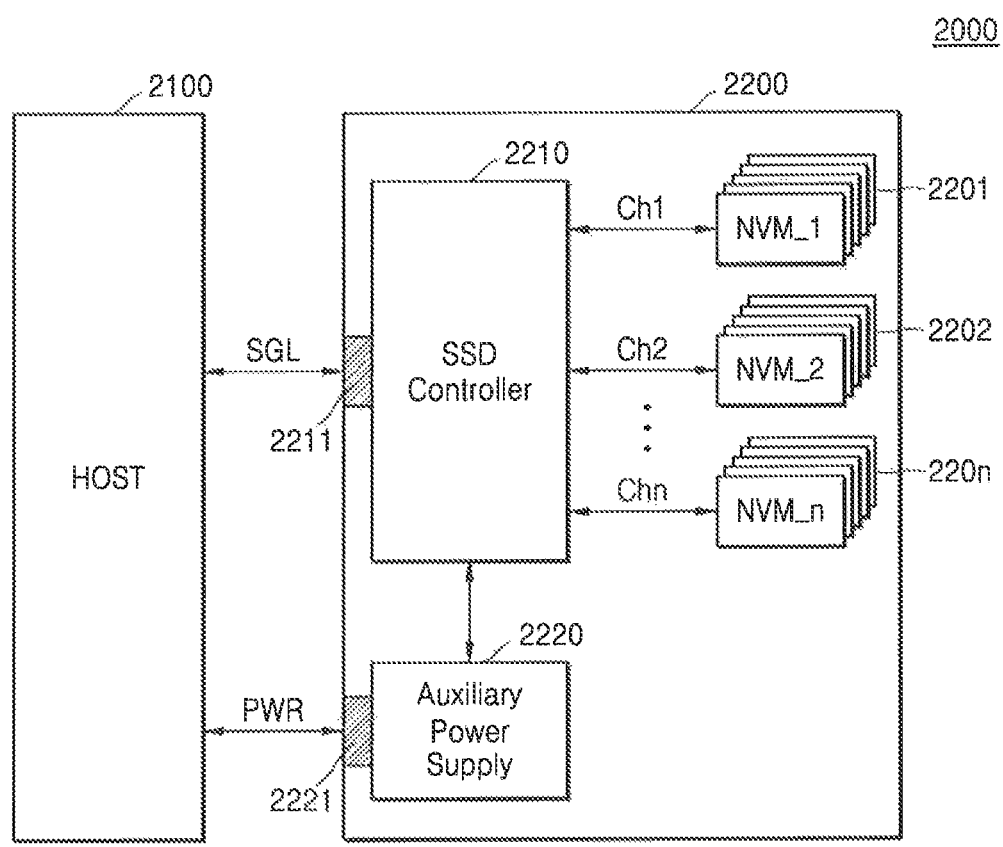
FIG. 14 is a block diagram showing an example, in which a storage device according to the embodiment is applied to a solid state drive (SSD).

FIG. 14 is a block diagram showing an example, in which a storage device according to the embodiment is applied to a solid state drive (SSD) 2200.

Referring to FIG. 14, an SSD system 2000 includes a host 2100 (e.g., a host device) and the SSD 2200. The SSD system 2000 may be the storage system 10 or 10a shown in FIG. 1 or FIG. 9, the host 2100 may be the host device 200 or 200a shown in FIG. 1 or FIG. 9, and the SSD 2200 may be the storage device 100 or 100a shown in FIG. 1 or FIG. 9.

The SSD 2200 exchanges signals with the host 2100 via the signal connector 2211 and receives an input of electric power via a power connector 2221. The SSD 2200 include a plurality of nonvolatile memories 2201 to 220n, an SSD controller 2210, and an auxiliary power device 2220 (e.g., a power supply). The plurality of nonvolatile memories 2201 to 220n may be used as storage media of the SSD 2200. The SSD 2200 may include non-volatile memory devices such as PRAM, MRAM, ReRAM, FRAM, etc., besides the non-volatile memories. The plurality of nonvolatile memories 2201 to 220n may be connected to the SSD controller 2210 via a plurality of channels CH1 to CHn. The non-volatile memory 2201 to 220n may be flash memories. One or more flash memories may be connected to one channel. The one or more flash memories connected to one channel may be connected to the same data bus.

The SSD controller 2210 may exchange a signal SGL with the host 2100 via the signal connector 2211. Here, the signal SGL may include a command, an address, or data. The SSD controller 2210 may write data in a corresponding flash memory or read data from the corresponding flash memory according to a command from the host 2100.

The auxiliary power device 2220 may be connected to the host 2100 via the power connector 2221. The auxiliary power device 2220 may receive power PWR from the host 2100 to be charged. While the auxiliary power device 2220 is illustrated as being located in the SSD 2200, in an alternate embodiment, the auxiliary power device 2220 is located outside the SSD 2200. For example, the auxiliary power device 2220 may be located on a main board to provide the SSD 2200 with auxiliary power.

While the inventive concept has been particularly shown and described with reference to exemplary embodiments thereof, it will be understood that various changes in form and details may be made therein without departing from the spirit and scope of the inventive concept.

What is claimed is:

1. A storage device comprising a non-volatile memory comprising a plurality of memory blocks,
wherein the storage device is configured to perform an alignment operation in response to receipt of an align command, a logical address of a logical segment, and write data,
wherein the alignment operation converts the logical address into a physical address, and when a subsequent write of the write data would cause the write data to be written to a first memory block among the memory blocks that is not free, the alignment operation allocates the physical address to a physical block address of a second memory block of the memory blocks that is free, and
wherein the storage device is further configured to perform garbage collection in units of the physical block address that indicates one memory block.

2. The storage device of claim 1, being configured to allocate the physical address using a log-structured system.

3. The storage device of claim 1, being configured to perform the align operation when a physical dummy region included in the non-volatile memory is equal to or smaller than a reference value.

4. The storage device of claim 3, wherein the reference value is determined according to a ratio of a size of the physical dummy region with respect to a size of a region in which data is written in a total storage space of the non-volatile memory.

5. The storage device of claim 3, being configured to ignore the align command when the physical dummy region included in the non-volatile memory exceeds a reference value.

6. The storage device of claim 1, wherein the align command is included in a write command.

7. The storage device of claim 1, further comprising a host interface configured to receive a write command and the align command,
wherein the host interface separately receives the write command and the align command.

8. The storage device of claim 1, being configured to output a misalignment signal when a physical dummy address region occurs in the physical block address.

9. A storage device comprising a non-volatile memory comprising a plurality of memory blocks,
wherein the storage device creates a dummy storage region of a first size in a first memory block among the memory blocks having a physical block address when unable to store data of the first size at the physical block address,
wherein the storage device outputs a misalignment signal indicating a misalignment of the physical block address and a logical segment based on the created dummy storage region, the misalignment signal indicating a number of physical pages addresses included in the created physical dummy address region, and
wherein the storage device is configured to perform garbage collection in units of the physical block address that indicates one memory block.

10. The storage device of claim 9, being configured to allocate a physical address using a log-structured system.

11. The storage device of claim 9, further comprising a command queue in which write commands are enqueued, and being configured to allocate a physical address in succession to the physical dummy address region based on the write commands enqueued in the command queue.

12. The storage device of claim 9, further comprising a host interface configured to receive a write command and an align command from outside,
wherein the host interface separately receives the write command and the align command, and
wherein the storage device is configured to allocate a physical address to a new physical block address in response to the align command.

13. The storage device of claim 9, being configured to receive an align command from outside and allocate a physical address to a new physical block address in response to the align command, where the align command is included in a write command.

14. A storage system comprising:
a storage device comprising a non-volatile memory comprising a plurality of memory blocks, the storage device being configured to perform garbage collection in units of a physical block address that indicates one memory block; and
a host device configured to control the garbage collection in the storage device in units of a logical segment,
wherein the storage device transmits a misalignment signal to the host device when a starting point of the logical segment is misaligned with a starting point of the physical block address,
wherein the misalignment signal indicates a number of physical pages addresses included in a physical dummy address region of the physical block address causing a misalignment.

15. The storage system of claim 14, wherein the host device allocates a logical address to a new logical segment when receiving the misalignment signal.

16. The storage system of claim 14, wherein the misalignment is caused by the physical dummy address region, and
the misalignment signal comprises information about a size of the physical dummy address region.

17. The storage system of claim 16, wherein the host device secures a logical dummy address region corresponding to a size of the physical dummy address region based on the misalignment signal.

18. The storage system of claim 17, wherein the storage device further comprises a command queue in which write commands are enqueued, and
an operation of the host device for securing the logical dummy address region and an operation of the storage device for writing data in response to the write commands enqueued in the command queue are performed in parallel with each other.

19. The storage system of claim 14, wherein each of the plurality of memory blocks comprises a plurality of pages,
a logical page address and a physical page address respectively indicate corresponding pages, and
a number of logical page addresses included in the logical segment is equal to a number of physical page addresses included in the physical block address.

* * * * *